(12) United States Patent
Tokita et al.

(10) Patent No.: US 8,979,691 B2
(45) Date of Patent: Mar. 17, 2015

(54) SILENT CHAIN

(75) Inventors: Toshikazu Tokita, Nabari (JP); Yukio Yoshida, Matsusaka (JP); Akio Matsuda, Nabari (JP)

(73) Assignee: BorgWarner Inc., Auburn Hills, MI (US)

( * ) Notice: Subject to any disclaimer, the term of this patent is extended or adjusted under 35 U.S.C. 154(b) by 600 days.

(21) Appl. No.: 12/997,308

(22) PCT Filed: Jun. 15, 2009

(86) PCT No.: PCT/US2009/047358
§ 371 (c)(1),
(2), (4) Date: May 26, 2011

(87) PCT Pub. No.: WO2009/155238
PCT Pub. Date: Dec. 23, 2009

(65) Prior Publication Data
US 2011/0224041 A1    Sep. 15, 2011

(30) Foreign Application Priority Data
Jun. 20, 2008   (JP) ................................. 2008-161656

(51) Int. Cl.
*F16G 13/04* (2006.01)
(52) U.S. Cl.
CPC .................................... *F16G 13/04* (2013.01)
USPC ........................................ 474/213; 474/212
(58) Field of Classification Search
CPC ................................................... F16G 13/04
USPC ................. 474/212, 213, 153, 155, 156, 157
See application file for complete search history.

(56) References Cited

U.S. PATENT DOCUMENTS

| | | | | |
|---|---|---|---|---|
| 1,840,081 | A * | 1/1932 | Breer | 474/157 |
| 1,956,942 | A * | 5/1934 | Belcher et al. | 474/139 |
| 2,525,561 | A * | 10/1950 | Pierce | 474/213 |
| 2,718,153 | A * | 9/1955 | Dean | 474/140 |
| 2,770,977 | A * | 11/1956 | Beckadolph et al. | 474/153 |
| 3,120,409 | A * | 2/1964 | Beall | 305/179 |
| 3,597,985 | A * | 8/1971 | Jeffrey | 474/148 |
| 3,656,361 | A * | 4/1972 | Honda | 474/140 |
| 5,006,096 | A * | 4/1991 | Breher | 474/153 |
| 5,013,286 | A * | 5/1991 | Breher | 474/205 |
| 5,170,883 | A * | 12/1992 | Ledet et al. | 198/834 |
| 5,456,638 | A * | 10/1995 | Osborn | 474/155 |
| 5,470,282 | A * | 11/1995 | Ledvina et al. | 474/156 |
| 5,758,484 | A * | 6/1998 | Ledvina et al. | 59/5 |
| 6,106,425 | A * | 8/2000 | Mott | 474/219 |
| 6,364,800 | B1 * | 4/2002 | Avramidis et al. | 474/213 |
| 6,379,278 | B1 * | 4/2002 | Eguchi et al. | 477/34 |
| 6,419,604 | B2 * | 7/2002 | Saito et al. | 474/213 |
| 6,440,022 | B1 * | 8/2002 | Ichikawa et al. | 474/213 |

(Continued)

FOREIGN PATENT DOCUMENTS

JP   H10-122308   9/1996
JP   H11-182634   12/1997

*Primary Examiner* — Henry Liu (57) ABSTRACT

A silent chain 1 in which a large number of link plates 2 comprising a pair of tooth parts 22 and pin holes 21 are stacked in the thickness direction and the length direction and are linked by linking pins 3, and guide plates 4 are mounted on the linking pins 3. The guide plates 4 are arranged in guide rows G at a central position in the width direction and at positions at both ends in the width direction, and the height H of the back part of each guide plate 4 is greater than the height h of the back parts of the link plates 2.

6 Claims, 5 Drawing Sheets

(56) References Cited

U.S. PATENT DOCUMENTS

| | | | |
|---|---|---|---|
| 6,575,861 B2* | 6/2003 | Markley et al. | 474/156 |
| 6,855,084 B2* | 2/2005 | Sato et al. | 475/209 |
| 6,988,831 B2* | 1/2006 | Nakamura et al. | 384/513 |
| 7,094,170 B2* | 8/2006 | Young | 474/161 |
| 7,837,583 B2* | 11/2010 | Tohara | 474/213 |
| 2002/0006237 A1* | 1/2002 | Nakamura et al. | 384/490 |
| 2002/0025870 A1* | 2/2002 | Kozakura et al. | 474/214 |
| 2002/0111238 A1* | 8/2002 | Okabe et al. | 474/213 |
| 2002/0137583 A1* | 9/2002 | Fink et al. | 474/155 |
| 2002/0142874 A1* | 10/2002 | Markley et al. | 474/202 |
| 2003/0104891 A1* | 6/2003 | Saitoh et al. | 474/212 |
| 2003/0216207 A1* | 11/2003 | Mu et al. | 474/213 |
| 2004/0166978 A1* | 8/2004 | Matsuda et al. | 474/212 |
| 2006/0068959 A1* | 3/2006 | Young et al. | 474/212 |
| 2006/0094551 A1* | 5/2006 | Tohara | 474/212 |
| 2008/0293530 A1* | 11/2008 | Makita | 474/152 |

* cited by examiner

SILENT CHAIN

TECHNICAL FIELD

The present invention relates to a silent chain in which a large number of link plates comprising a pair of tooth parts and pin holes are stacked in the thickness direction and the length direction and are linked by linking pins.

BACKGROUND OF THE INVENTION

A silent chain is used as a timing chain in motor vehicles and motorcycles etc. The silent chain generally has a configuration in which a large number of link plates comprising respective pairs of tooth parts and pin holes are respectively linked in a pivotable manner by linking pins which are inserted into each pin hole, with guide plates being arranged outside the outermost link plates and fixed to the ends of the linking pins. The guide plates are designed to position the silent chain with respect to sprockets when the silent chain is wound onto the sprockets, and they do not have tooth parts which mesh with the sprockets.

Accordingly, silent chains generally have a configuration in which guide rows which include guide plates and comprise a plurality of link plates in the chain width direction, and non-guide rows which do not include guide plates and comprise a plurality of link plates in the chain width direction, are alternately arranged in the chain length direction.

After the silent chain has been assembled, the whole of the silent chain is subjected to an excessive tensile load in what is known as a prestressing operation, in order to reduce pitch variations between the link plates of the silent chain and to improve the fatigue strength of the silent chain.

However, the guide plates of the silent chain which do not have tooth parts are more rigid than the link plates which do have tooth parts, and therefore when the chain is subjected to the excessive tensile load during the prestressing operation, the pitch of the guide plates is largely unchanged, even if the pitch of the link plates changes. Furthermore, in such cases, there is a large change in the pitch of the link plates close to the centre of the linking pins, but there is little change in the pitch of the link plates towards the ends of the linking pins, like the guide plates, and the pitch balance is uneven. As a result, a phenomenon in which the linking pins flex arises after the prestressing operation.

Meanwhile, when the silent chain is travelling, the portions of the silent chain on the back face slide over the chain sliding surfaces of the tensioner arm and chain guide during travel, whereby the slackness of the slack side span of the chain is eliminated, while the travel of the tension side span is guided.

However, with conventional silent chains, the whole surface of the portions of the silent chain on the back face are in contact with the chain sliding surfaces of the tensioner arm and chain guide, and consequently there are drawbacks in terms of large sliding resistance when the chain is travelling.

The silent chain disclosed in Japanese Unexamined Patent Application Publication H10-122308 has a configuration in which link plates with a high back part and link plates with a low back part are combined, and when there is contact with the tensioner arm and chain guide, only the link plates with a high back part are designed to come into contact with the chain sliding surfaces of the tensioner arm and chain guide, and this makes it possible to reduce the sliding friction when the chain is travelling. Furthermore, in this case, the link plates with a low back part are made to be thicker than the link plates with a high back part so as to endow both sets of link plates with the same degree of rigidity.

With the silent chain disclosed in Japanese Unexamined Patent Application Publication H11-182634, the height of the back parts of the link plates in the link rows is increased, or the height of the back parts of the link plates and guide plates in the guide rows is increased, by means of which the sliding resistance with the chain sliding surfaces of the tensioner arm and chain guide is reduced.

In both of the systems disclosed in the publications mentioned above, the height of the back parts of some of the link plates (and guide plates) is increased relative to the other parts, from the point of view of reducing the sliding resistance when the back parts of the silent chain make contact with the tensioner arm and chain guide. However, increasing the height of the back parts of some of the link plates (and guide plates) causes the pitch balance after the prestressing operation to become uneven.

With the system disclosed in Japanese Unexamined Patent Application Publication H10-122308 it is disclosed that the thickness of the link plates having a low back part is made to be greater than the thickness of the link plates having a high back part so that both sets of link plates have the same degree of rigidity, but such cases lead back to a conventional silent chain in which highly rigid guide plates are placed at both ends of the linking pins and the pitch balance after the prestressing operation is uneven.

With the system disclosed in Japanese Unexamined Patent Application Publication H11-182634, the rigidity of the link plates in the guide rows is relatively low when the height of the back parts of the link plates in the link rows is increased, and therefore there is a relatively large change in the pitch of the link plates in the guide rows after the prestressing operation, making the pitch balance uneven. Furthermore, the rigidity of the link plates in the link rows is relatively low when the height of the back parts of the link plates and guide plates in the guide rows is increased, and therefore there is a relatively large change in the pitch of the link plates in the link rows after the prestressing operation, likewise making the pitch balance uneven.

SUMMARY OF THE INVENTION

The present invention has been devised in view of the situation that has existed until now, and the issue which the present invention aims to resolve is that of providing a silent chain with which the pitch balance after the prestressing operation can be made even, while the sliding resistance with the tensioner arm and chain guide can be reduced during travel.

The silent chain in accordance with a preferred embodiment of the invention is provided with: a plurality of link plates each comprising a pair of tooth parts and pin holes which are stacked in the thickness direction and the length direction and are respectively linked in a pivotable manner by linking pins; and guide plates which are mounted on the linking pins for positioning the silent chain with respect to sprockets when the silent chain is wound on the sprockets. The silent chain has a configuration in which guide rows including guide plates and comprising a plurality of link plates in the chain width direction, and non-guide rows not including guide plates and comprising a plurality of link plates in the chain width direction are alternately arranged in the chain length direction. The guide plates are arranged in the guide rows at positions at both ends in the chain width direction and at a central position in the chain width direction, and the height of the back part of each guide plate is greater than the height of the back parts of the link plates within the guide rows and non-guide rows.

In particular, the invention provides an improved structure for making the pitch balance after a prestressing operation even, and for reducing sliding resistance with the tensioner arm and chain guide during travel of the chain.

According to a preferred embodiment of the invention, the guide plates are arranged in the guide rows not only at positions at both ends in the chain width direction, but also at a central position in the chain width direction. In this case, changes in pitch of the link plates close to the centre of the linking pins are suppressed by means of the guide plates in the central position in the chain width direction, whereby the pitch balance of each link plate can be made even. This also means that the height of the back part of each guide plate is greater than the height of the back part of the link plates within the guide rows and non-guide rows, and therefore only the back parts of the guide plates slide over the chain sliding surfaces of the tensioner arm and chain guide when the silent chain is in contact with the tensioner arm and chain guide, thus making it possible to reduce the sliding resistance when the chain is travelling.

In another embodiment of the invention, the thickness of the guide plates is smaller than the thickness of the link plates. The guide plates are necessary for positioning the silent chain with respect to the sprockets, and therefore they are more rigid in terms of shape than the link plates. The thickness of the guide plates is smaller than the thickness of the link plates, and therefore the overall rigidity of the guide plates are reduced, thereby making it possible to improve the pitch balance after the prestressing operation.

In another preferred embodiment of the invention, the thickness of the guide plates can be 60-70% of the thickness of the link plates. The guide plates can be endowed with the same degree of rigidity as the link plates, whereby the pitch balance after the prestressing operation can be further improved.

In still another embodiment, the guide plates are generally rectangular plates which do not have tooth parts. In a further embodiment, at least the back parts of the guide plates are finished, but the back parts of the link plates are not finished. Only the back parts of the guide plates which come into contact with the chain sliding surfaces of the tensioner arm and chain guide undergo finishing, and therefore the friction on each chain sliding surface can be reduced and production costs can be reduced.

With the silent chain according to the present invention, the guide plates are arranged in the guide rows not only at positions at both ends in the chain width direction, but also at a central position in the chain width direction, and therefore changes in pitch of the link plates close to the centre of the linking pins are suppressed by means of the guide plates in the central position in the chain width direction, whereby the pitch balance of each link plate can be made even. This also means that the height of the back part of each guide plate is greater than the height of the back part of the link plates within the guide rows and non-guide rows, and therefore only the back parts of the guide plates slide over the chain sliding surfaces of the tensioner arm and chain guide when the silent chain is in contact with the tensioner arm and chain guide, thus making it possible to reduce the sliding resistance when the chain is travelling.

BRIEF DESCRIPTION OF THE DRAWINGS

FIG. 4(a) is an enlarged front view of a link plate making up part of the silent chain, and (b) is an enlarged side view thereof;

FIG. 5(a) is an enlarged front view of a guide plate making up part of the silent chain, and (b) is an enlarged side view thereof.

DESCRIPTION OF THE PREFERRED EMBODIMENTS

Figure 1:
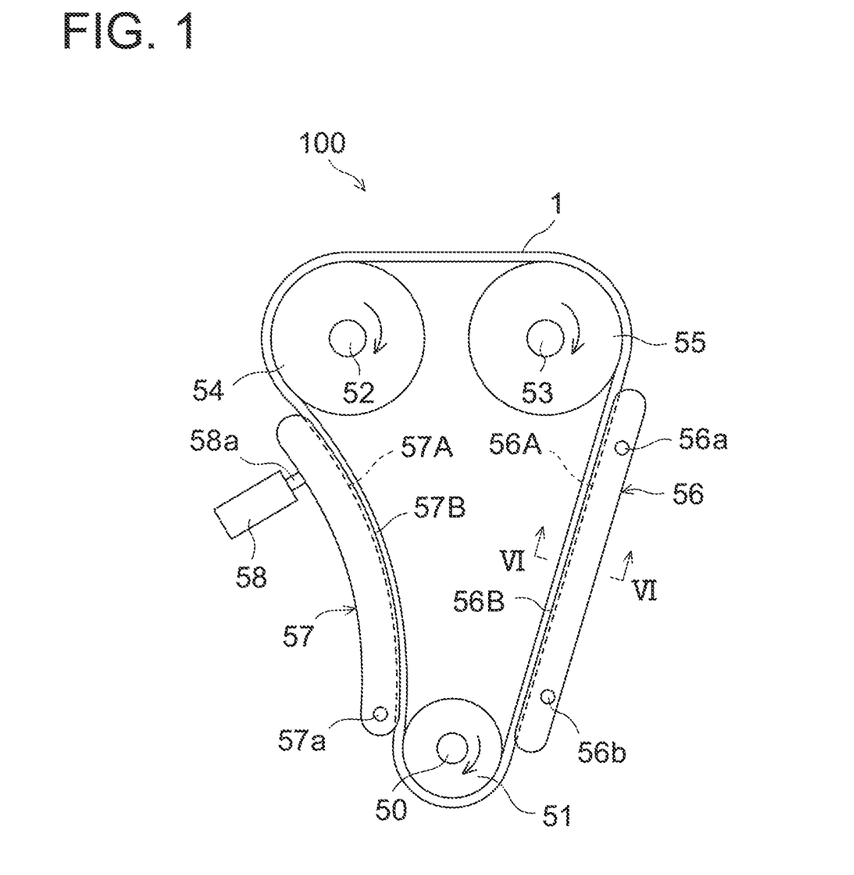
FIG. 1 is a schematic of the structure of a camshaft timing system in an engine which employs the silent chain according to an exemplary embodiment of the present invention.
Figure 2:
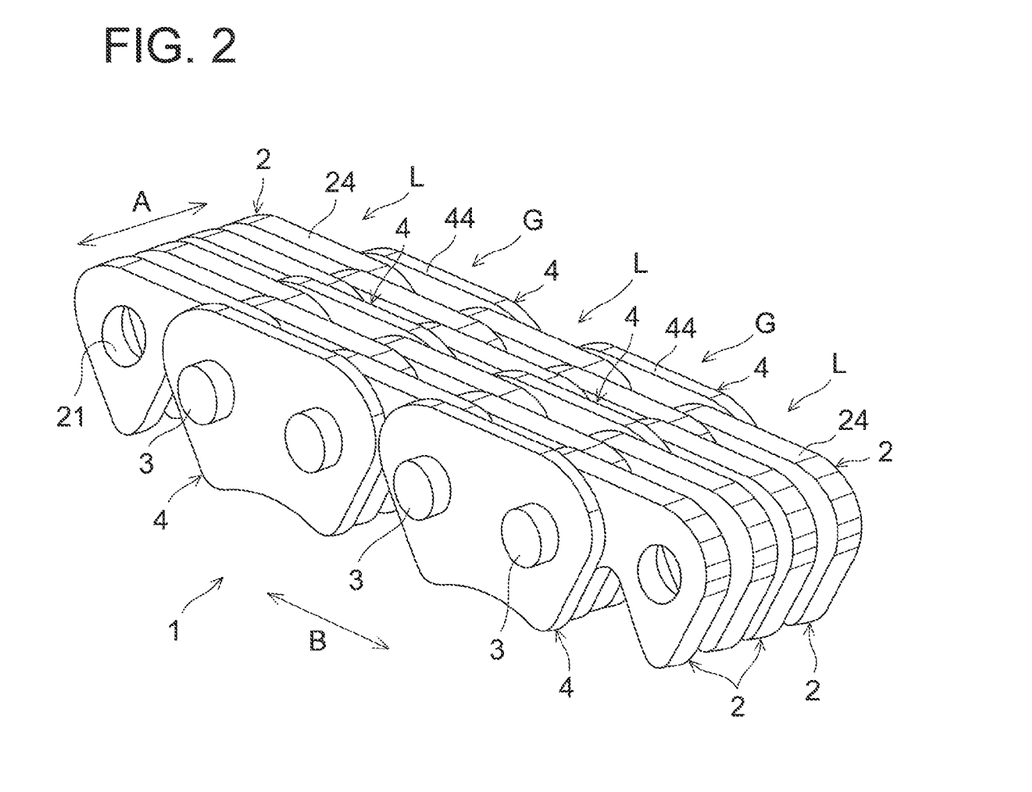
FIG. 2 is a partial oblique view seen from the back part side of the silent chain according to an exemplary embodiment of the present invention.
Figure 3:
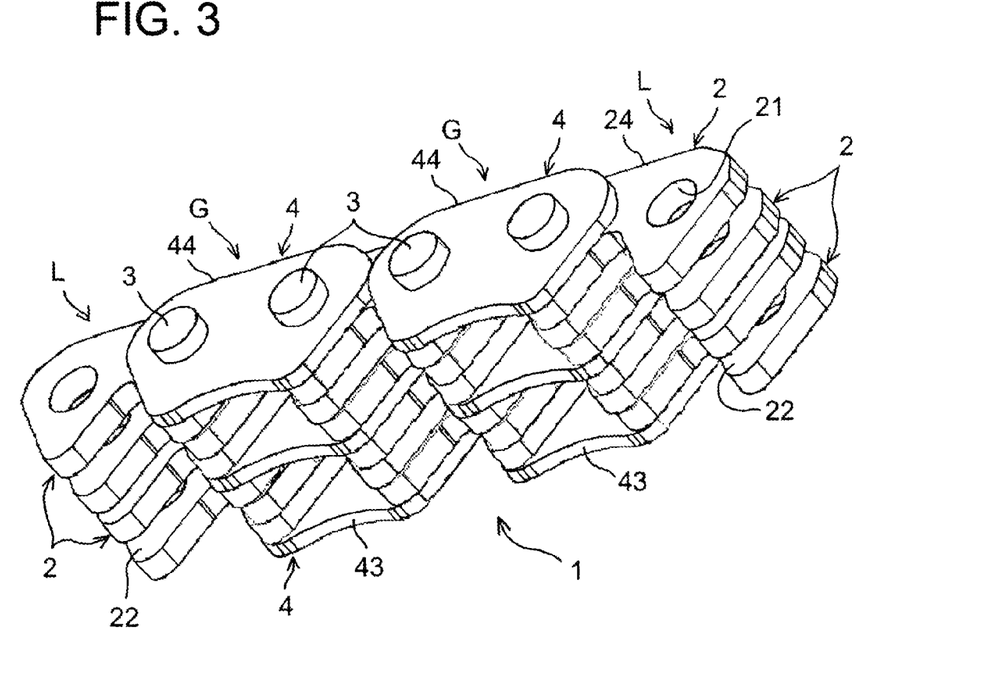
FIG. 3 is a partial oblique view seen from the bottom side of the silent chain (FIG. 2)
Figure 4:
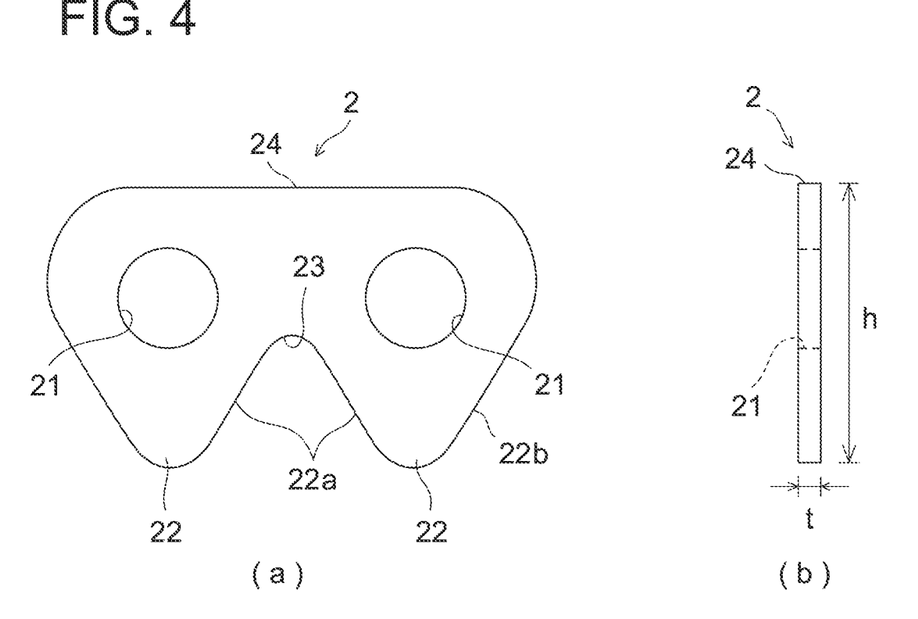
Figure 5:
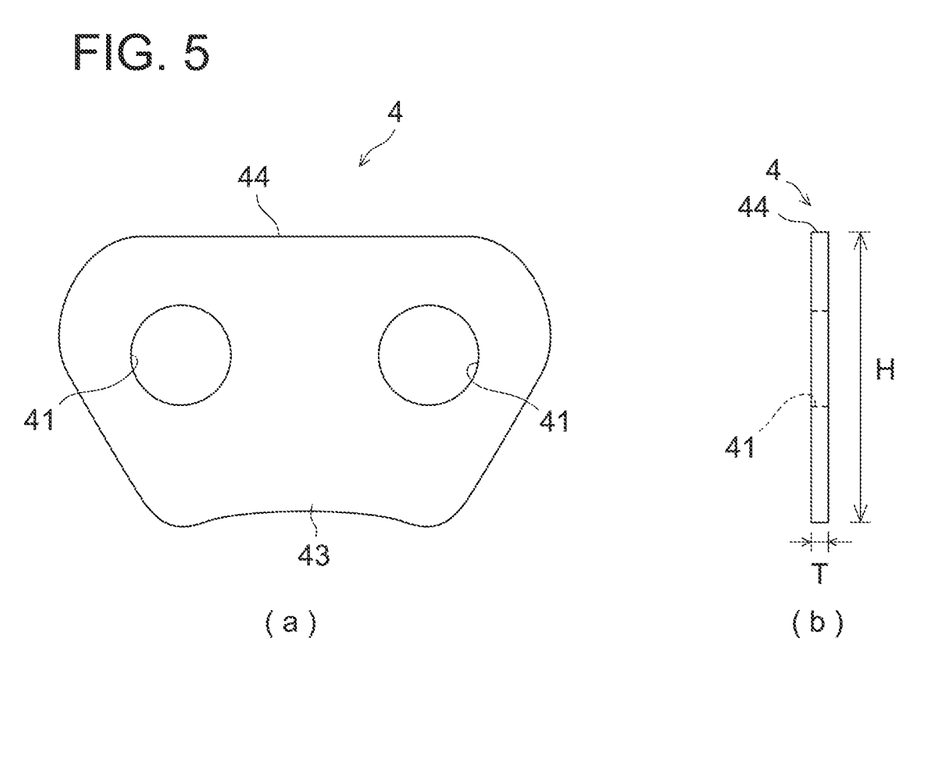
Figure 6:
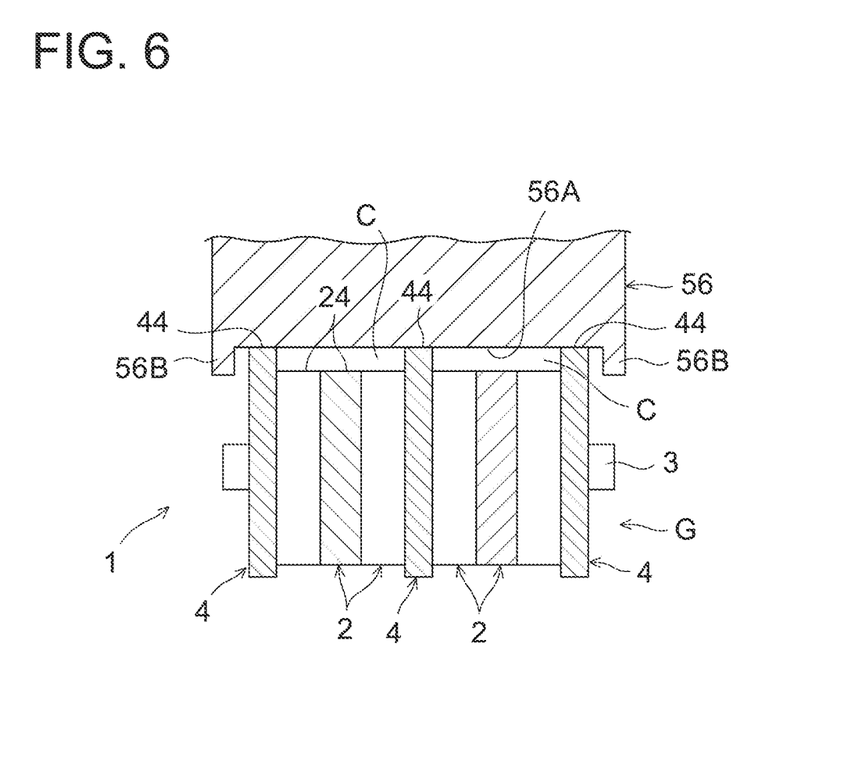
FIG. 6 is a view corresponding to a cross section along the line VI-VI in FIG. 1, illustrating the state of contact between the silent chain and the chain guide.

FIGS. 1 to 6 are figures for illustrating the silent chain according to an exemplary embodiment of the present invention, where FIG. 1 is a schematic of the structure of a camshaft timing system in an engine which employs the silent chain according to this exemplary embodiment; FIGS. 2 and 3 are partial oblique views of the silent chain; FIG. 4(a) is a front view of a link plate, and (b) is a side view thereof; FIG. 5(a) is a front view of a guide plate, and (b) is a side view thereof; and FIG. 6 is a view in cross section along the line VI-VI in FIG. 1.

As shown in FIG. 1, a camshaft timing system 100 in an engine which employs the silent chain according to this exemplary embodiment is provided with a crank sprocket 51 mounted on a crankshaft 50, cam sprockets 54, 55 mounted on two camshafts 52, 53, respectively, and a silent chain 1 which is wound around these sprockets 51, 54, 55. It should be noted that in FIG. 1 the clockwise arrows denote the direction of rotation of each of the sprockets 51, 54, 55.

A chain guide 56 for guiding the travel of the chain 1 is arranged at the tension side span of the silent chain 1. The chain guide 56 is fixed to a member on the engine side by way of fixing bolts 56a, 56b which are provided at both ends thereof. The chain guide 56 has a chain sliding surface 56A on which the travelling chain 1 slides, and a pair of guide walls 56B which are arranged at the left and right edges of the chain sliding surface 56A and stand upright therefrom.

A tensioner arm 57 for maintaining the tension of the chain 1 is arranged at the slack side span of the silent chain 1. The tensioner arm 57 is mounted so as to be able to swine on the engine side member by way of a pivot bolt 57a which is provided at the pivoting end thereof. A tensioner 58 for exerting a pressing force on the tensioner arm 57 is provided at the free end of the tensioner arm 57. The tip end of a piston rod 58a of the tensioner 58 abuts the free end of the tensioner arm 57. The tensioner arm 57 has a chain sliding surface 57A on which the travelling chain 1 slides, and a pair of guide walls 57B which are arranged at the left and right edges of the chain sliding surface 57A and stand upright therefrom.

As shown in FIGS. 2 and 3, this silent chain 1 has a configuration in which a large number of link plates 2 are stacked in the thickness direction (the direction of the arrow A in FIG. 2) and the length direction (the direction of the arrow B in this figure), and these link plates 2 are pivotably linked to one another by linking pins 3, while guide plates 4 are arranged at the outermost side thereof and in the centre in the chain width direction (the direction of the arrow A in this figure) and mounted on the linking pins 3. The outermost guide plates 4 are fixedly attached to both ends of the linking pins 3 by means of riveting or the like. Note that a description is given here of an example in which round pins with a circular cross section are used as the linking pins 3, but the present invention can also be applied in the same way to a silent chain employing, rockers; comprising long, and short pairs of joint pins and rocker pins.

The silent chain 1 has a plurality of guide rows G which are arranged at the same positions in the chain length direction as the guide plates 4 (the direction of the arrow B in FIG. 2) and consist of link plates 2 and guide plates 4, and a plurality of non-guide rows L which are arranged between each of the adjoining guide rows G in the chain length direction and consist of link plates 2 only, without any guide plates 4. The guide rows G and non-guide rows L are alternately arranged in the chain length direction.

As shown in FIG. 4(a), the link plates 2 have a pair of pin holes 21 and tooth parts 22. A linking pin 3 is inserted into each pin hole 21. Each tooth part 22 consists of inner flank surfaces 22a and outer flank surfaces 22b which mesh with the sprocket teeth (not depicted), and each inner flank surface 22a is linked by way of a crotch part 23. As shown in (b) of this figure, the height of the back part 24 of the link plate 2 is h, and the thickness is t.

As shown in FIG. 5(a), the guide plates 4 are roughly rectangular plates having a pair of pin holes 41; they do not have tooth parts, and a guide part 43 for positioning the silent chain 1 with respect to the sprockets when the silent chain 1 is wound on the sprockets is formed at the bottom thereof. As shown in (b) of this figure, the height of the back part 44 of the guide plate 4 is H, this height H being greater than the height h of the back part 24 of the link plate 2 (i.e. H>h). Furthermore, the thickness of the guide plate 4 is T, this thickness T being smaller than the thickness t of the link plate 2 (i.e. T<t). The thickness T of the guide plate 4 is preferably 60-70% of the thickness t of the guide plate 2. That is to say, $T=(0.6-0.7) \times t$.

FIG. 6 shows a cross section in the chain width direction passing through the centre of the guide plates 4 in conjunction with the chain guide 56. In this figure, the link plates 2 and guide plates 4 in the guide row G are shown with diagonal lines, and the link plates 2 of the non-guide row L adjoining these in the chain length direction are shown in outline. As this figure shows, the guide plates 4 in the guide row G are provided in two places at the outermost sides and in one place at a central position, making a total of three places. Furthermore, only the back parts 44 of the guide plates 4 come into contact with the chain sliding surface 56A of the chain guide 56.

The operational effects of this exemplary embodiment will be described next.

As shown in FIGS. 2 and 3, after the silent chain 1 has been assembled, a prestressing operation is carried out in order to subject the silent chain 1 to an excessive tensile load. At this time, the guide plates 4 of the guide row G are arranged not only in positions at both ends in the chain width direction, but also in a central position in the chain width direction.

In this case, changes in pitch of the link plates 2 towards the two ends of the linking pins 3 are suppressed due to the guide plates 4 positioned at the two ends in the chain width direction, and changes in pitch of the link plates 2 close to the centre of the linking pins 3 are suppressed at this time due to the guide plates 4 positioned at the centre in the chain width direction, whereby the pitch balance of each link plate 2 can be made even. Moreover, the thickness T of the guide plates 4 in this case is smaller than the thickness t of the link plates 2, and therefore the rigidity of the guide plates 4 can be reduced (the guide plates 4 can be endowed with the same degree of rigidity as the link plates 2 especially when the thickness T is 60-70% of the thickness t), and the pitch balance during the prestressing operation can be further improved.

Furthermore, when the silent chain 1 is in operation, the silent chain 1 slides over the chain guide 56 and tensioner arm 57 as it travels.

The state of contact between the silent chain 1 and chain guide 56 will now be described with the aid of FIG. 6. As shown in this figure, when the silent chain 1 is travelling over the chain guide 56, only the back parts 44 of the guide plates 4 of the silent chain 1 are in contact with the chain sliding surfaces 56A of the chain guide 56, and the back parts 24 of the link plates 2 do not come into contact with the chain sliding surface 56A. Furthermore, the travel of the silent chain 1 over the chain guide 56 is guided by virtue of the fact that the guide walls 56B at both the left and right edges of the chain sliding surface 56A guide the movement of the guide plates 4.

In this case, the height of the back parts 44 of the guide plates 4 is greater than the height of the back parts 24 of the link plates 2 in the guide rows G and non-guide rows L, and therefore when the silent chain 1 is in contact with the chain guide 56, only the back parts 44 of the guide plates 4 slide over the chain sliding surface 56A of the chain guide 56, and by means of this the sliding resistance of the chain as it travels can be reduced, and friction losses can be reduced.

It should be noted that when the link plates 2 and guide plates 4 are produced, the back parts 24 of the link plates 2 need not undergo finishing, and at least the back parts 44 only of the guide plates 4 may undergo finishing (punching by means of fine blanking, for example).

In this case it is possible to reduce the cost of producing the silent chain 1, while also making it possible to reduce the friction on the chain sliding surfaces 56A, 57A of the chain guide 56 and tensioner arm 57 on which the back parts 44 of the guide plates slide.

Furthermore, when the silent chain 1 is in contact with the chain sliding surfaces 56A, 57A of the chain guide 56 and tensioner arm 57, a space C (see FIG. 6) is formed between the back parts 24 of the link plates 2 of the silent chain 1 and the chain sliding surfaces 56A, 57A, and therefore the heat which is generated between the back face parts of the silent chain and the chain sliding surfaces 56A, 57A can be released outside the chain sliding surfaces 56A, 57A because of this space C, which makes it possible to suppress the generation of heat and makes it possible to prevent oxidation of the oil. Furthermore, fresh oil can be supplied into the space C, making it possible to prevent deterioration of the oil.

In the exemplary embodiment described above, a description was given of an example in which a roughly rectangular guide plate without a toe part was used as the guide plate 4, but what is known as a low-rigidity guide plate which has a toe part at the upper side is also feasible as a guide plate which is suitable for use in the present invention.

While the invention described in connection with various embodiments, it will be understood that the invention is not limited to those embodiments. On the contrary, the invention covers all alternatives, modifications, and equivalents as may be included within the spirit and scope of the appended claims.

The invention claimed is:

1. A silent chain comprising a plurality of link plates each comprising a pair of tooth parts and pin holes which are stacked in the thickness direction and the length direction and are respectively linked in a pivotable manner by linking pins; and guide plates which are mounted on the linking pins for positioning the silent chain with respect to sprockets when the silent chain is wound on the sprockets;

the silent chain having a configuration in which guide rows including guide plates and comprising a plurality of link plates in the chain width direction, and non-guide rows not including guide plates and comprising a plurality of link plates in the chain width direction are alternately arranged in the chain length direction; and the guide plates being arranged in the guide rows at positions at both ends in the chain width direction and at a central position in the chain width direction, and the height of the back part of each guide plate is greater than the height of the back parts of the link plates within the guide rows and non-guide rows;

the thickness of the guide plates is 60-70% of the thickness of the link plates; and wherein the pitch balance of the link plates is improved.

2. The silent chain according to claim 1, wherein the guide plates comprise substantially rectangular plates which do not have tooth parts.

3. The silent chain according to claim 1, wherein at least the back parts of the guide plates undergo finishing, and the back parts of the link plates do not undergo finishing.

4. A silent chain comprising a plurality of link plates each comprising a pair of tooth parts and pin holes which are stacked in the thickness direction and the length direction and are respectively linked in a pivotable manner by linking pins; and guide plates which are mounted on the linking pins for positioning the silent chain with respect to sprockets when the silent chain is wound on the sprockets;

the silent chain having a configuration in which guide rows including guide plates and comprising a plurality of link plates in the chain width direction, and non-guide rows not including guide plates and comprising a plurality of link plates in the chain width direction are alternately arranged in the chain length direction; and the guide plates being arranged in the guide rows at positions at both ends in the chain width direction and at a central position in the chain width direction, and the height of the back part of each guide plate is greater than the height of the back parts of the link plates within the guide rows and non-guide rows;

the thickness of the guide plates is smaller than the thickness of the link plates; and the back parts of the guide plates being finished, and the back parts of the link plates not being finished.

5. The silent chain according to claim 4, wherein the thickness of the guide plates is 60-70% of the thickness of the link plates.

6. The silent chain according to claim 4, wherein the guide plates comprise substantially rectangular plates which do not have tooth parts.

* * * * *